United States Patent [19]

Messer

[11] 4,225,912
[45] Sep. 30, 1980

[54] CONTROL FOR AN AUXILIARY COMMUTATION CIRCUIT

[75] Inventor: Gordon J. Messer, Tolland, Conn.

[73] Assignee: United Technologies Corporation, Hartford, Conn.

[21] Appl. No.: 972,543

[22] Filed: Dec. 22, 1978

[51] Int. Cl.³ .................... H02H 7/122; H02M 7/515
[52] U.S. Cl. .................................... 363/57; 363/96; 363/135
[58] Field of Search ................................ 363/56–58, 363/96, 135, 136

[56] References Cited

U.S. PATENT DOCUMENTS

| | | | |
|---|---|---|---|
| 3,207,974 | 9/1965 | McMurray | 363/136 |
| 3,249,844 | 5/1966 | Jensen | 363/139 |
| 3,935,528 | 1/1976 | Brennelsen et al. | 363/136 X |

Primary Examiner—William M. Shoop
Attorney, Agent, or Firm—Richard P. Lange

[57] ABSTRACT

A supplemental or auxiliary portion of the commutation circuit for an inverter is actuated only during overload conditions which improve the inverter efficiency during normal load conditions. A control circuit responds to the increased time period of the commutation pulse to delay the firing of the thyristors which initiate the makeup pulse. This modified operation continues for at least three commutation cycles in order to ensure that the supplemental portion of the commutation circuit is properly initialized so that it is ready for subsequent overcurrent conditions.

5 Claims, 2 Drawing Figures

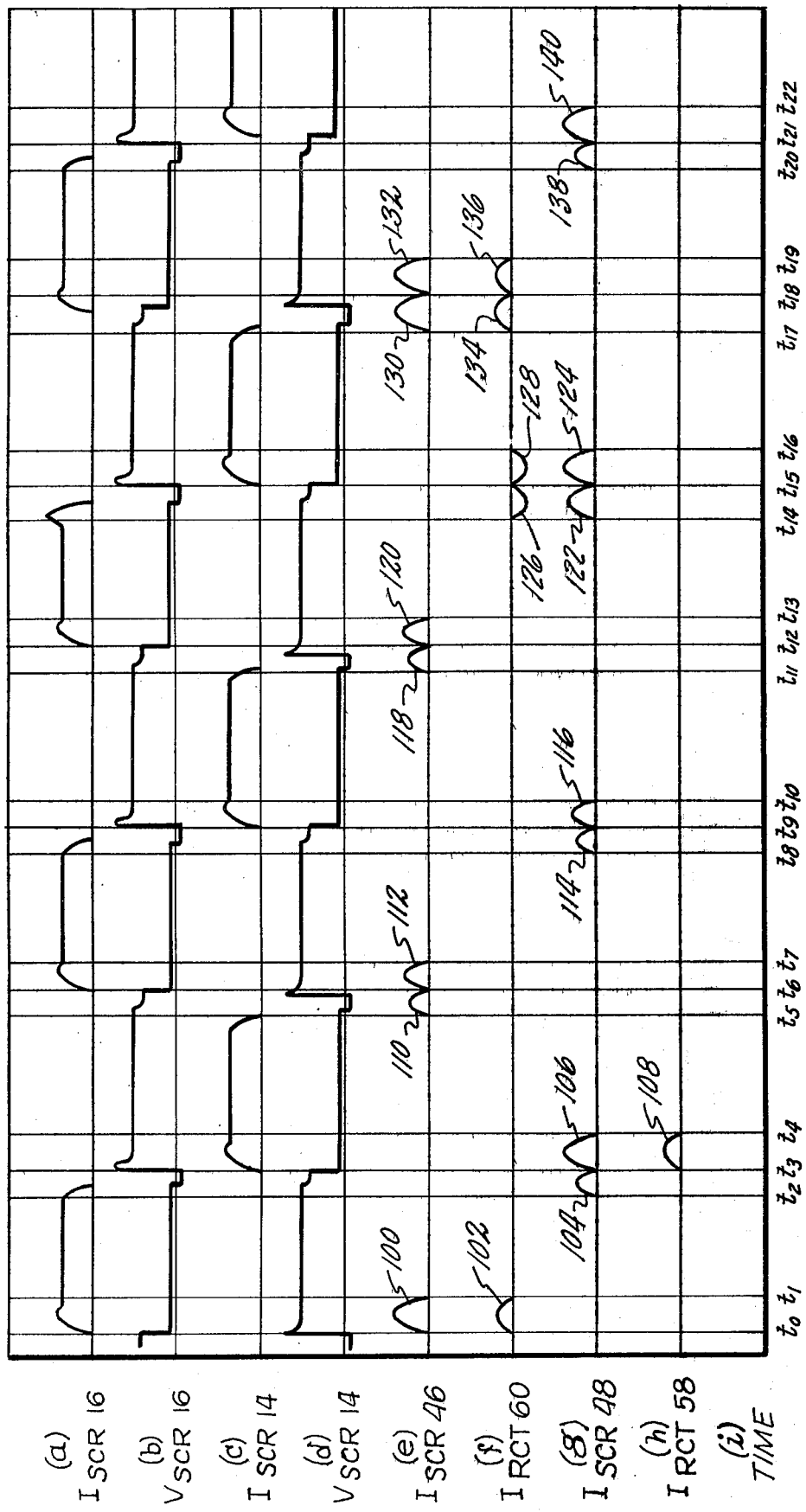

CONTROL FOR AN AUXILIARY COMMUTATION CIRCUIT

BACKGROUND OF THE INVENTION

1. Field of the Invention

This invention relates to inverters, and more particularly, to a pulse stretching circuit for use in conjunction with an auxiliary commutation circuit to aid in the commutation of the main thyristors of an inverter during transient or overcurrent conditions.

2. Description of the Prior Art

Inverters are known generally and are devices which transform DC (direct current) electrical energy, such as from a fuel cell or the like, into AC (alternating current) electrical energy suitable for use by utility companies or other consumers of electrical energy. Most inverters include at least one pair of main switching elements, and by alternatively actuating each switching element, electrical energy from the DC source flows through a first load in one direction and then in the reverse direction forming a fundamental AC waveform.

Numerous different types of switching devices can be employed in an inverter as a switching element to reverse the current through the load. Semiconductor switches, such as thyristors, are frequently used in present day inverters and this type of device is substantially unidirectional so that the high energy current pulses pass in only one direction through the semiconductor switch from the input terminal to the output terminal when the switch is turned on by a control signal. Some semiconductor switches, as is known, will not immediately change from a conducting state to a nonconducting state upon the removal of the control signal from the control terminal, but require that the magnitude of the instantaneous current passing therethrough be reduced to near zero allowing the semiconductor switch to transition to its off state.

The process by which the current is reduced to zero is known as "commutation" and numerous circuit configurations have been proposed for this function. Many commutation circuits operate by presenting a commutation pulse to the load from a storage device, such as a capacitor or resonant circuit, for a period of greater than the turn off time of the semiconductor switch. Since during this period the load current is supplied by the storage device of the commutation circuit, the magnitude of the current to the semiconductor switch drops to zero for sufficient period to allow transition to the nonconducting state.

It is well known in the art that the amount of energy stored in the commutation capacitors is a function of the value or capacitance of the capacitors as well as the voltage impressed on the capacitor; however, the amount of stored energy required to commutate the main semiconductor switches is proportional to the magnitude of the current therethrough, i.e. the greater the magnitude of the load current, the more stored energy required to commutate the semiconductor switches. Accordingly, the value of the commutation capacitor or capacitors is often selected by ascertaining the highest value of load current which must be commutated, and then sizing the commutation capacitors such that the necessary commutation pulse can be provided.

Prior art inverters are also known which include a commutation circuit having an auxiliary portion which is only operative during overcurrent conditions. The amount of electrical energy stored and discharged during each commutation cycle is reduced in that only the amount of energy required for a normal commutation must be stored. However, during a transient or other overcurrent condition which results in a high instantaneous value of load current during the commutation period for the main semiconductor switches, the additional energy stored in appropriate portions of the auxiliary commutation circuit is gated on to supplement the normal commutation pulse.

A particular problem with an auxiliary commutation circuit which switches additional capacitance into a normal commutation cycle is that the variation in resonant frequency which occurs as a result of the change in capacitance must be considered in the sequencing of the switches. Because the natural period of the commutation current pulses has been varied, the zero crossing point of the commutation current pulse no longer coincides with the original thyristor switch point and the makeup pulse begins prematurely which causes a makeup pulse of excessive amplitude.

Of particular interest in U.S. application Ser. No. 930,469 of J. P. Vivirito filed on Aug. 2, 1978 entitled AUXILIARY COMMUTATION CIRCUIT FOR AN INVERTER assigned to the same assignee as the present invention, which discloses an auxiliary commutation circuit of the impulse commutated bridge inverter type in which additional commutation energy is stored on a pair of oppositely charged capacitors. Switching elements in series with the capacitors are operable in response to a sensed overcurrent condition to provide additional stored energy during commutation.

Also of particular interest is U.S. Pat. No. 3,249,844 issued May 3, 1966 to J. Jensen for SEMICONDUCTOR APPARATUS in which the load current of an inverter is sensed to control switching elements for introducing additional commutating capacitors as the load current demand increases. It is important to note that these auxiliary capacitors (items 30–32 in the drawing) are coupled into the inverter circuit in parallel with the continuously operating capacitor (item 27 of the drawing) when the auxiliary capacitors are in an uncharged state. This is significant because without stored energy in the auxiliary capacitor, the increased amount of energy required to extinguish a transient current through a thyristor is not available and the thyristor cannot be commutated to its off state. In fact, the introduction of an uncharged auxiliary capacitor into the commutation circuit at a time when a transient condition occurs can have a significant adverse effect in that the charge required by the auxiliary capacitor diminishes the commutation energy available for extinguishing the main thyristor.

Of interest is U.S. application Ser. No. 936,277 by J. Messer et al. filed on Aug. 23, 1978 entitled TWO-STAGE COMMUTATION CIRCUIT FOR AN INVERTER which discloses a commutation circuit having at least two portions with different energy storage capability, each of which is suited to a particular level of input voltage. One portion of the commutation circuit is suitably sized to commutate the magnitude of the load current at lighter loads while the second portion of the commutation is sized to commutate the thyristor current during higher load current levels. A control circuit is described for sensing the levels of the DC input voltage and current detector to allow the transition between the two portions of the commutation circuit at a time interval in which the load current is essentially zero.

SUMMARY OF THE INVENTION

A primary object of the present invention is to provide a control circuit for use with an auxiliary commutation circuit which commutates the main semiconductor switching elements of an inverter.

According to the present invention, a control circuit for a DC-to-AC power inverter renders an auxiliary portion of the commutation circuits operative during overcurrent or transient conditions. The time period of the supplemental commutation pulse is extended to allow the natural decay of the supplemental pulse along its half sinusoidal waveform so that the makeup pulse is initiated when the instantaneous value of the current is low.

According to a particular feature of the present invention, an auxiliary portion of a commutation circuit is actuated under overload conditions to improve inverter efficiency but yet provide sufficient commutation energy by a particularly designed control circuit. Severe transients which cause high overcurrent conditions is the main semiconductor switches can be commutated without increasing the size or storage capability of the commutation capacitors used under no load conditions. This inherently improves inverter efficiency by minimizing the RMS value of the current circulating in the commutation circuit for extinguishing the main semiconductor thyristors.

Other objects, features and advantages of the present invention will become apparent in the light of the following detailed description of a preferred embodiment as illustrated in the accompanying drawings.

BRIEF DESCRIPTION OF THE DRAWING

FIG. 2 is a graph illustrating the waveforms at various points in FIG. 1 during the operation of a power inverter according to the present invention.

DETAILED DESCRIPTION OF THE ILLUSTRATED EMBODIMENT

Figure 1:
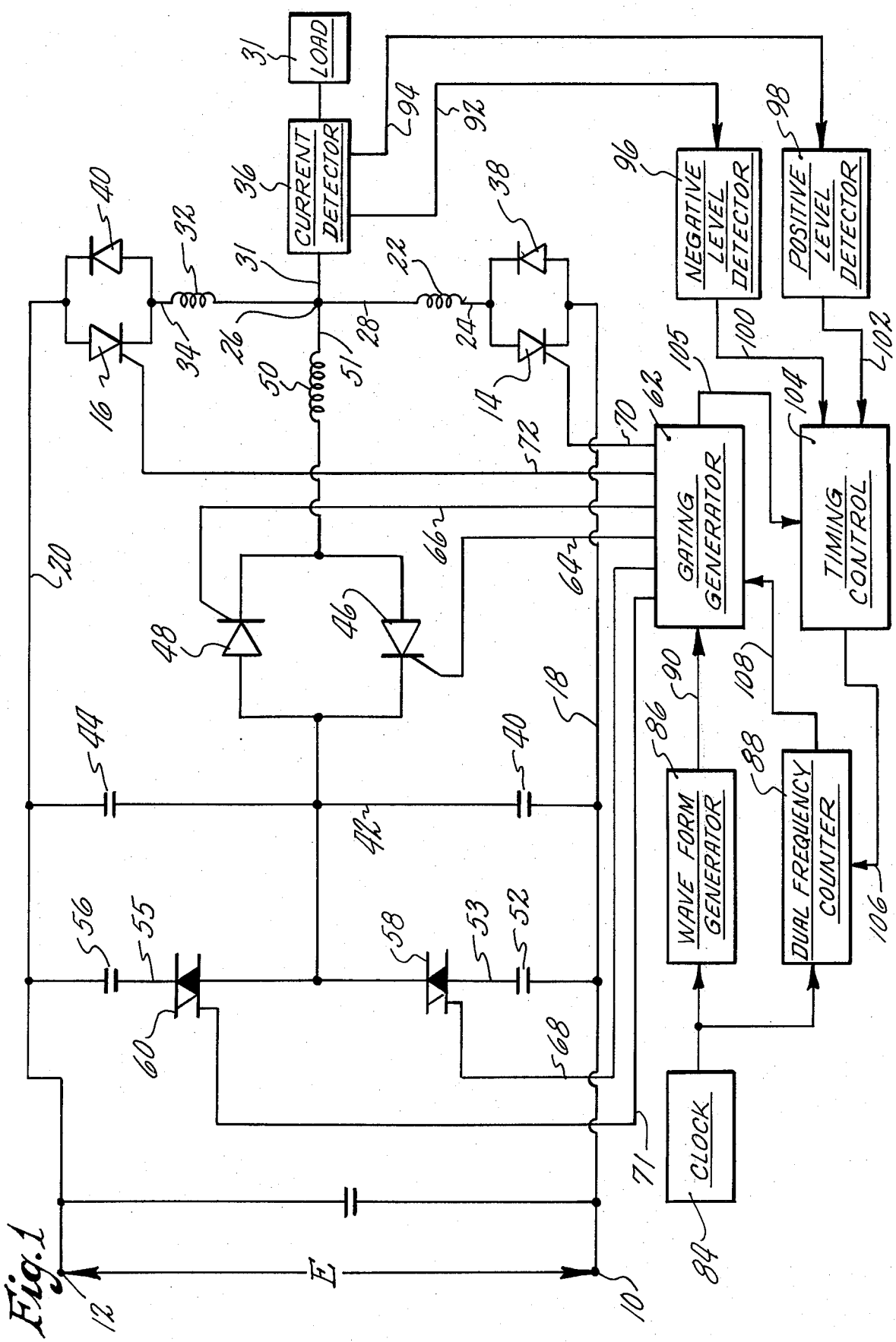
FIG. 1 is a block diagram of a control circuit configuration for a power inverter according to the present invention together with a commutation circuit having an auxiliary portion.

Referring initially to FIG. 1, one embodiment of a DC-to-AC power inverter with a broad illustration of a control scheme for the power inverter according to the present invention is illustrated, a more complete discussion of this control scheme to be provided hereinafter. The conventional power inverter includes a negative bus 10 and a positive bus 12 which receives DC electrical energy from an external source (not shown) such as a fuel cell or the like. A pair of main semiconductor switches, such as thyristor 14 and thyristor 16, are connected to switch the incoming DC electrical energy. The thyristors 14 and 16 are connected by leads 18 and 20, respectively, to the negative input bus 10 and the positive input bus 12, respectively, allowing unidirectional current to flow from the external energy source. An inductor 22 is connected by a lead 24 to the anode side of thyristor 14 while the other side of the inductor 22 is connected to an output node 26 by a line 28. A load 31 is connected by line 31 between the output node 26 and ground. On the positive side of the inverter, one side of an inductor 32 is connected by a lead 34 to the cathode side of the thyristor 16, while the other side of the inductor 32 is connected by a lead 34 to the output node 26. A diode 38 in the negative portion of the inverter shunts the thyristor 14 while a diode 40 situated on the positive side of the inverter shunts the thyristor 16 for creating a small positive cathode-to-anode voltage potential across the respective thyristors to aid their commutation. A current detector 36 is positioned in line 31 to sense the magnitude of the positive and negative current flowing to the load 29.

As is well known, many semiconductor switches, such as thyristors 14 and 16, change from their nonconducting state to their conducting state almost instantaneously in response to the application of a suitable control signal to their control terminals. However, in order to change such semiconductor switches from their conducting state to their nonconducting state, the current therethrough must be reduced to zero for a predetermined period of time, known as the turn off time, before the switch transitions to its nonconducting state. The process by which a semiconductor switch is transitioned from its conducting to its nonconducting state is generally known as "commutation." A particular advantage of the present invention is that this commutation circuit can be selected and sized for normal load conditions but yet an auxiliary portion of the commutation circuit stores additional energu to assist the continuous commutation circuit during transient or surge conditions. The continuously operating portion of the commutation circuit includes a capacitor 40 connected by a line 42 to a capacitor 44, the combination of which is connected across the lines 18 and 20 shunting the input busses. One side of a pair of thyristors 46 and 48, coupled in a back-to-back configuration, is connected to the line 42 while the other side is connected to one side of an inductor 50. The other side of the inductor 50 is connected via line 51 to the output node 26. The supplemental portion of the commutation circuit includes a capacitor 52 connected by a line 53 to one side of a switch, such as an RCT (reverse conducting thyristor) 58. The other side of the RCT 58 is connected to the line 42. In a similar manner, one side of a capacitor 56 is connected to the line 20 while the other side is connected by a line 55 to one side of a switch, such as RCT 60. The other side of the RCT 60 is also connected to the continuously operating portion of the commutation circuit at the line 42. The RCT's 58 and 60 essentially include a unidirectionally controlled pathway in which leakage in the uncontrolled direction maintains the charge on the capacitors 52 and 56 during operation in a manner that will be described in greater detail hereinafter. If a switch with a lower leakage current than a compensated series RCT string is employed, it may be necessary to shunt the switch with a high resistance to initially charge the auxiliary capacitor to E/2. Of course, other semiconductor switches shunted by a suitable diode could also be used.

As indicated hereinbefore, the thyristors 14 and 16 are alternatively rendered conductive to provide current flow from the input busses to the load; whereas the instantaneous current through the switching elements must be reduced to near zero for a certain length of time, or if desired, supplemented by a positive cathode-to-anode voltage to reduce that length of time, before transition to the nonconducting state will take place. The control circuit of the present invention provides the signal waveforms which actuate all of the switching elements of the inverter. Accordingly, the control circuitry includes a gating signal generator 62 which creates a plurality of gating signal waveforms which are properly timed to actuate the component parts of the inverter. The thyristor gating generator 62 actuates the continuously operating portion of the commutation circuit and is connected by a line 64 to the control terminal of the thyristor 46 as well as by the line 66 to the thyristor 48. To render these supplemental portions of the commutation circuit operative, the thyristor gating generator 62 is connected to the RCT 58 by a line 68 and to the RCT 60 by a line 70. The thyristor gating generator 62 is also connected to the control terminals of the thyristors 14 and 16 by a line 71 and 72, respectively, to provide a control signal waveform for alternatively actuating the main semiconductor switches at a rate related to the desired fundamental of the output voltage.

It should be understood that a conventional control technique for the split-C type of inverter illustrated in FIG. 1 would normally be much more complex than that herein illustrated so that a number of output parameters, such as phase angle, voltage magnitude, etc. of the output power can be varied. However, in that the methods for changing the switching waveforms to vary these output parameters are known to those of ordinary skill and play no part in the present invention, a description of such control functions has not been presented herewith. Referring still to FIG. 1, this particular embodiment of the pulse stretching control circuit includes a clock 84 which provides a clock signal to both a waveform generator 86 and a dual frequency counter 88. The waveform generator 86 creates at least one signal waveform pattern which is, in essence, a preselected thyristor switch pattern related to the desired frequency and harmonic content of output voltage waveform. The waveform generator 86 is connected by the line 90 to the gating generator 62 which both conditions the signals from the waveform generator 86 to a level suitable for driving the RCTs and also introduce delays compatible with the natural frequency of the resonant commutation circuit. To respond to the transient or overcurrent conditions in either direction, the bidirectional current detector 36 is connected by lines 92 and 94 to comparator circuits 96 and 98, respectively. The current level comparators match the signal proportional to the absolute magnitude of the negative or positive current flowing to the load 29 with a reference potential and in the event that such a comparison exceeds a preselected value, an output signal is presented via the lines 100 and 102 to a proportional timing control 104.

When an overcurrent condition exists, the proportional timing control 104 processes information received from the gating generator 62 via line 105 indicating the thyristor switching points together with the overcurrent indication on either line 100 or 102 and present a signal via the line 106 to the programmable counter 88, if appropriate. This is to render the auxiliary commutation circuit operative which will supplement the commutation circuit for that and one more commutation cycle, this being followed by reinitialization of the auxiliary capacitor. The reinitialization ensures that the supplemental commutation circuit is fully recharged. The dual frequency programmable counter 88 divides the clock signal by a preselected value in the absence of a signal on line 106, and in the presence of a signal on line 106 divides the clock signal by another preselected value. The output of the counter 88 is changed by the signal from the timing control 104 and presents a signal via the line 108 to the thyristor gating generator 62 to indicate that the supplemental commutation circuit should be actuated and that the gating generator should also appropriately change the thyristor gating time constants to be compatible with the supplemented commutation circuit.

In order to appreciate the improved operation of an inverter in which the control circuitry of the present invention has modified or changed the time constant of the commutation pulse, the operation of a split-C type of inverter as shown in FIG. 1 will now be described. Referring additionally to FIG. 2, there is seen a number of illustrations depicting signal waveforms at various points in FIG. 1. These illustrations have been simplified somewhat by deleting the harmonic components of the fundamental frequency. Referring to time $t_0$ the thyristor 14 has just switched to its nonconducting state and the thyristor 16 has been triggered to its conducting state by a signal from the gatng generator 62 applied to the respective control terminals. At the same time, the thyristor 46 is rendered conductive by a signal from the thyristor gating generator 62 applied through line 64 to its control terminal. A large magnitude, short duration pulse of current rings through the circuit consisting of the positive input bus 12, line 20, the thyristor 16, inductor 32, line 51, inductor 50, thyristor 46 to the line 42 where it charges the capacitor 44 negatively to a voltage level of approximately $E/2$ while at the same time charging the capacitor 40 positively to a voltage level of approximately $3E/2$. This current pulse, identified in illustration (e) of FIG. 2 as item 100, is known as a "makeup⇌" pulse for initializing the charged condition of the commutation capacitor. This pulse lasts until time $t_1$ when the capacitors 40 and 44 approach the aforementioned voltage level at which time they are suitably charged for commutation. In addition to this initialization of the continuously operating portion of the commutation circuit, the supplemental commutation circuit is also initialized. A current pulse of a comparable short duration also rings through the same aforementioned circuit through the diode portion of the RCT 60 where it charges the auxiliary capacitor 56 to a negative voltage level of approximately $E/2$. Because of the unidirectional characteristics of the RCT 60 in the off state, the charged capacitor 56 is not functional with the continuously operating portion of the commutation circuit but waits until it is triggered by a suitable signal from the thyristor gating generator 62. However, the voltage potential across the charged capacitor is maintained at the level of $E/2$ by a small "refresher" pulse which passes through the RCT 60 during every makeup pulse. Commutation of the thyristor 16 begins at the time $t_2$ when the thyristor 48 is rendered conductive allowing a current flow therethrough, shown in illustration (g) of FIG. 2 as pulse 104, which rapidly reduces the instantaneous value of the load current through thyristor 16, as seen in illustration (a) of FIG. 2, toward zero. Sequentially, a portion of the current pulse 104 flows through diode 40 producing a small positive cathode-to-anode voltage on the thyristor 16 which allows it to switch to its nonconducting state. Then, at time $t_3$, the other main semiconductor switch, thyristor 14 is rendered conductive by a signal impressed on its control terminal from the waveform generator 62 to initiate the negative going portion of the load cycle. Simultaneously, the thyristor 48 is rendered conductive and a makeup pulse, illustrated as item 106, rings therethrough to the capacitors 40 and 44 charging them to a voltage level of approximately $-E/2$ and $3E/2$, respectively, in preparation for the next commutation. Also, beginning at time $t_3$ is the initialization of the negative half portion of the auxiliary commutation circuit. This occurs when a short pulse of current, pulse 108 in illustration (h) of FIG. 2, rings through the same aforementioned path to the RCT 58 where it charges the auxiliary capacitor 52 via the line 53 to a negative voltage level of approximately E/2. In the same manner as before, the charged capacitor 52 is isolated from the continuously operating portion of the commutation circuit by the RCT 58 which is in its off condition. Moreover, the voltage level across the capacitor is maintained at the $-E/2$ level by the "refresher" pulse which passes through the unidirectional portion of this device during each makeup pulse.

The operation of the inverter together with the continuously operating portion of the commutation circuit will continue unimpeded under the control of the waveforms presented by the thyristor gating generator 62. Occasionally though, an electrical perturbation will occur in the load 29 causing a transient or current surge in the inverter, such an event being the switching of a capacitance bank or a lightening strike, where the load current is supplied to a power utility. In order to appreciate the significance of the control circuit according to the present invention, the operation of an inverter under such an overcurrent or surge condition will now be described. Presume that just prior to the time $t_{14}$ an overcurrent condition in the load 29 occurs which raises the instantaneous value of the current through the thyristor 16 to a magnitude greater than the capability of the continuously operating portion of the commutation circuit to extinguish. The signal presented by the current detector 36 exceeds the predetermined setting in the current level comparator 96 which in turn triggers the proportional timing control 104 into operation. At $t_{14}$ the normal cummutation of the thyristor 16 occurs in which both the continuously operating portion of the auxiliary commutation circuit and the supplemental portion of the circuit act in unison to create a commutation pulse (pulse 122 in illustration (g) of FIG. 2) of sufficient size to extinguish the current flowing through the thyristor 16. Without the supplemental commutation circuit acting in parallel with the continuously operating portion of the commutation circuit, the supplemental pulse would normally reach zero earlier than $t_{15}$, this difference being proportional to the change in response frequency. However, because of the additional capacitors in the circuit, the effective capacitance value of the commutation circuit has increased and the circuit configuration of the present invention varies the initialization of the makeup pulse to time $t_{15}$ to accommodate this change in the time constant of the commutation pulse 122. Accordingly, at time $t_{15}$ the thyristor 14 is gated to its on state and both of the capacitors 56 and 44 are rung from E/2 to a voltage level of 3E/2. By the time $t_{15}$, the thyristor 16 has been successfully commutated to its off state due to the addition of the capacitor 56 in the supplemental commutation circuit with the capacitor 44 in the continuously operating portion of the commutation circuit. At time $t_{16}$, capacitors 44 and 46 are charged to a voltage level of 3E/2 and capacitor 40 is at $-E/2$, in readiness to commutate main thyristor 14.

At $t_{17}$ commutation of main thyristor 14 is initiated by gating commutation thyristor 46. However, because of the charge polarity on auxiliary capacitor 56, it is free to discharge, with capacitor 44, through the diode portion of RCT 60. This has the effect of supplementing the commutation of main thyristor 14. By the time $t_{18}$, the thyristor 14 has been successfully commutated to its off state and main thyristor 16 is again gated on to complete the cycle. Even if the transient condition in the load no longer exists such that the signal presented to the comparator 96 by the current detector 36 no longer exceeds its preselected value, the supplemental commutation circuit continues to assist the continuously operating commutation circuit for one additional pulse or cycle. This was seen through the previous explanation, whereas the circuit sensed an overcurrent and activated the auxiliary circuit to assist in commutation of main thyristor 16. However, the circuit also automatically supplemented the alternate main thyristor 14. However, in order to ensure that capacitor 56 is appropriately charged for any subsequent overcurrent condition, the thyristor delay is continued another additional cycle. Of course, in the event that the overcurrent condition in the load 29 is still present, the auxiliary portion of the commutation circuit remains operative to assist commutation until no longer required.

Although the invention has been shown and described with respect to the preferred embodiment thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. An inverter for converting DC electrical energy into AC electrical energy, comprising:
   main semiconductor switch means responsive to a control waveform for periodically translating said switch means between its conducting and nonconducting states;
   commutation means including a primary portion and an auxiliary portion, each of which is controlled by a commutation switch means;
   generator means for creating a plurality of control waveforms to actuate said main semiconductor switch means and said commutation switch means; and
   control means for providing control signals to said commutation means and, in response to an overcurrent condition, for modifing said control waveform so that said primary portion and said auxiliary portion of said commutation means operate in unison to translate said main semiconductor switch means to its nonconducting state.

2. An inverter according to claim 1, wherein a gating generator provides said control waveforms to said main semiconductor switch means and said commutation means, and wherein a current detector is positioned in the output of said inverter for providing a signal to said gating generator for modifying said control waveform.

3. An inverter according to claim 2, further including a level detector means responsive to said current detector for comparing the magnitude of the negative and positive output current levels from said inverter with a reference, and providing an output signal in the event that the magnitude of said negative and positive current level exceeds said reference.

4. An inverter according to claim 1, wherein said auxiliary portion of said commutation means includes a pair of capacitors, each connected in series with a switch, and wherein a predetermined one of said capacitors is coupled in series with said primary portion of said commutation means in response to an overcurrent condition by said control means; and wherein said control means changes the time constants of said control waveform to said primary portion of said commutation means to compensate for the change in resonant frequency.

5. An inverter according to claim 4, wherein said changed time constant state of said control waveform for said auxiliary portion of said inverter continues for at least three commutation cycles to ensure that said predetermined one of said capacitors is appropriately recharged.

* * * * *